(No Model.) 3 Sheets—Sheet 1.
J. W. STREET.
APPARATUS FOR FEEDING STOCK ON CARS.
No. 336,873. Patented Feb. 23, 1886.
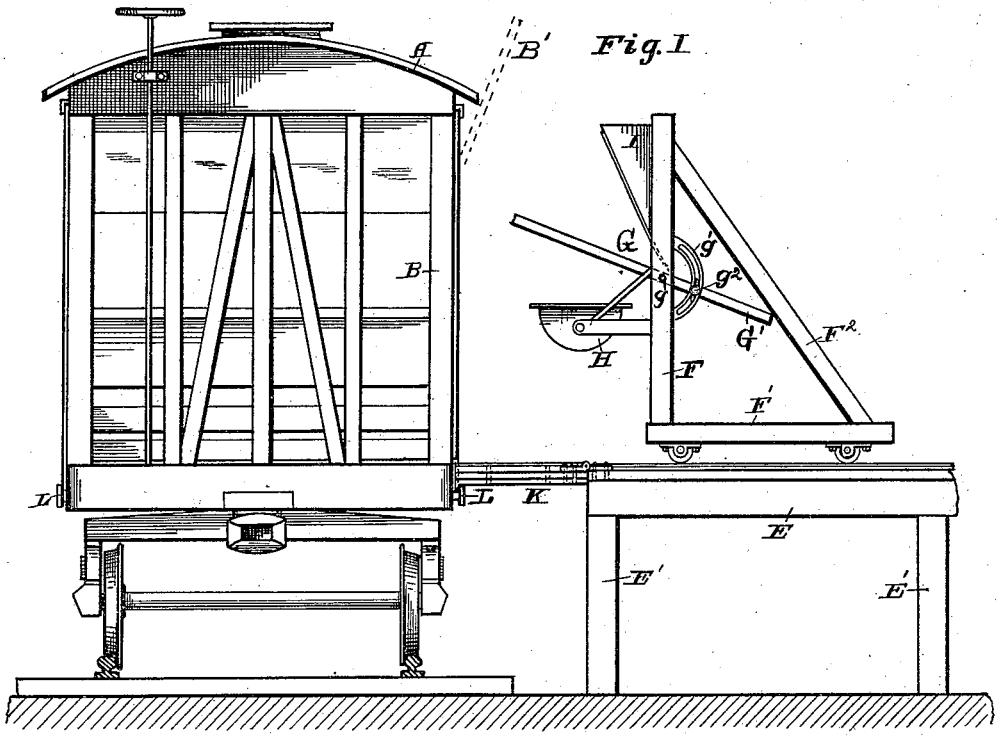
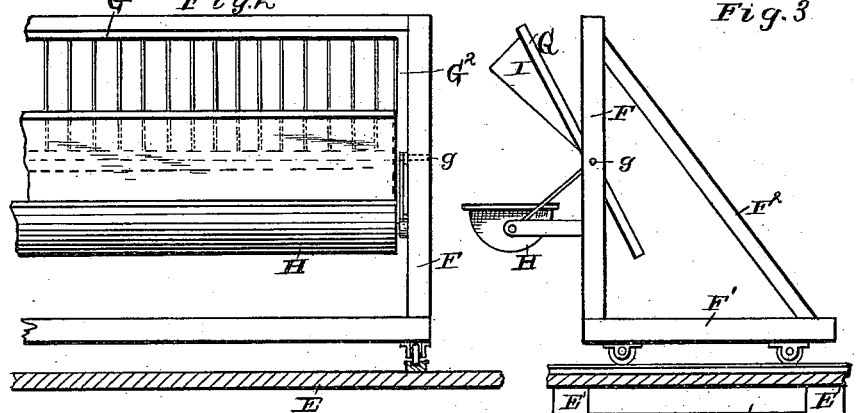
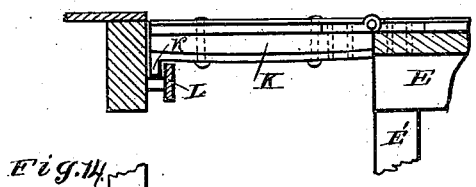
Witnesses:
J. C. Turner
P. W. Sommers
Inventor:
John W. Street
by Doubleday & Bliss
Attys.

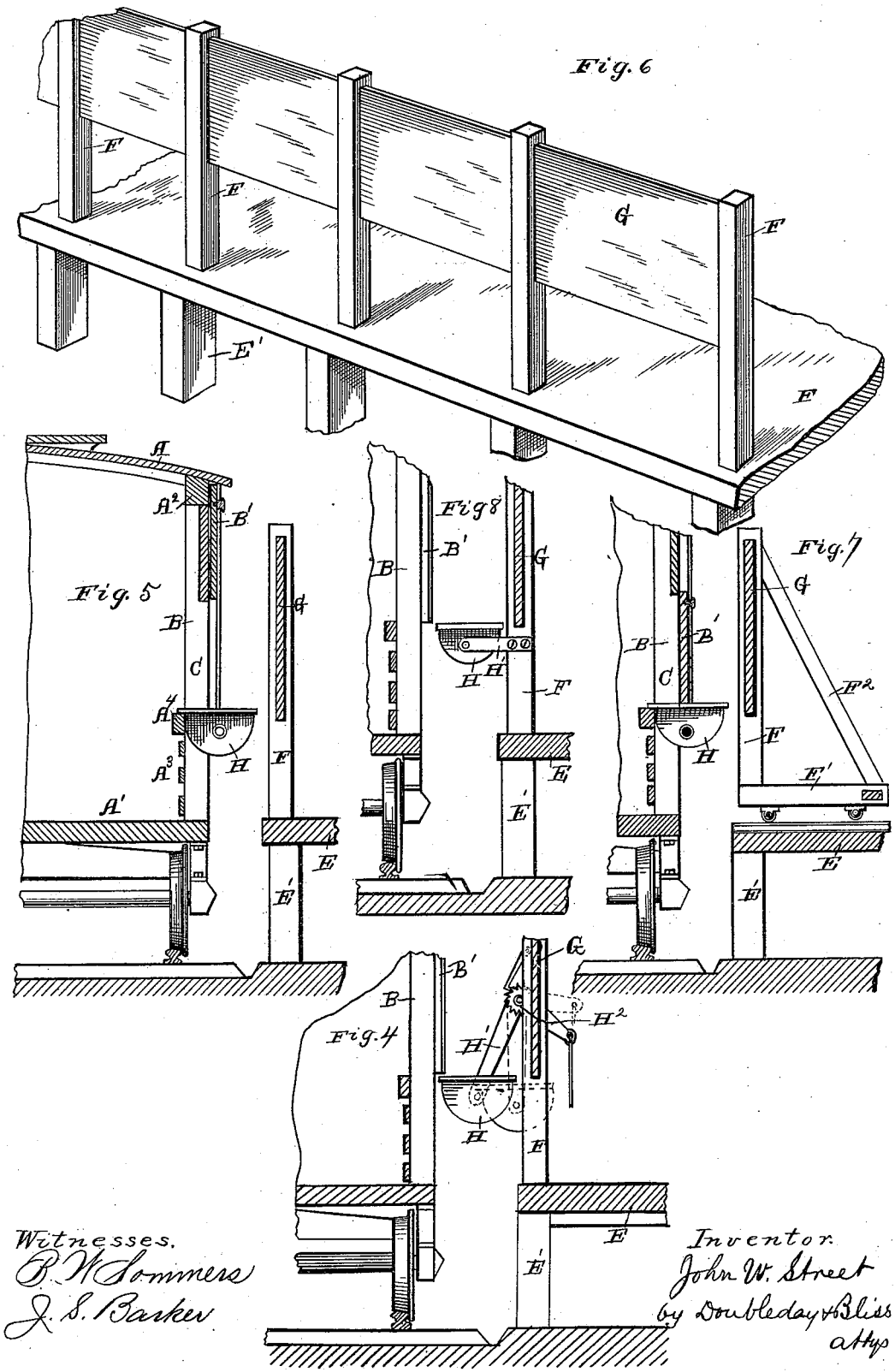

(No Model.) 3 Sheets—Sheet 3.
J. W. STREET.
APPARATUS FOR FEEDING STOCK ON CARS.
No. 336,873. Patented Feb. 23, 1886.
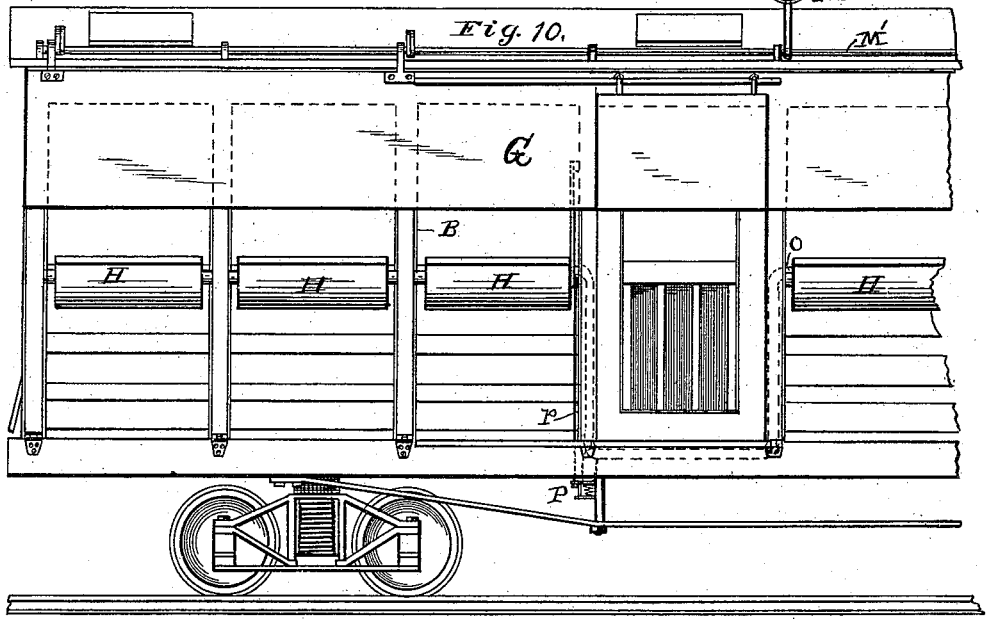
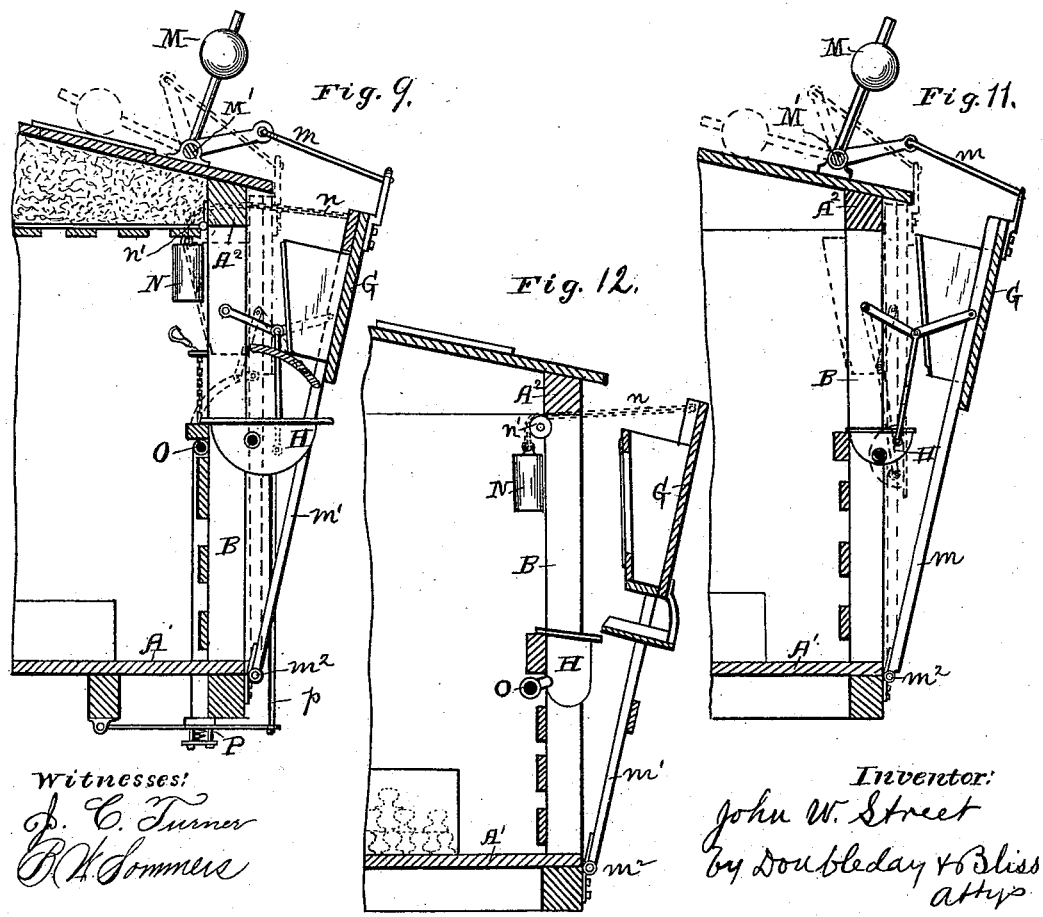
Witnesses:
J. C. Turner
R. H. Sommers
Inventor:
John W. Street
by Doubleday & Bliss
attys

UNITED STATES PATENT OFFICE.

JOHN W. STREET, OF CHICAGO, ILLINOIS.

APPARATUS FOR FEEDING STOCK ON CARS.

SPECIFICATION forming part of Letters Patent No. 336,873, dated February 23, 1886.

Application filed December 2, 1885. Serial No. 184,496. (No model.)

*To all whom it may concern:*

Be it known that I, JOHN W. STREET, a citizen of the United States, residing at Chicago, in the county of Cook and State of Illinois, have invented certain new and useful Improvements in Apparatus for Feeding, Watering, and Loading Cattle on Cars, of which the following is a specification, reference being had therein to the accompanying drawings.

Figure 1 shows in end view devices embodying my invention. Fig. 2 is a face view of the guard and of the feeding and watering devices in Fig. 1. Fig. 3 shows a modification. Figs. 4, 5, 6, 7, 8, 9, 10, 11, and 12 show other modified forms and arrangements. Figs. 13 and 14 are sectional views showing the construction of the gang-plank.

In the drawings I have shown a portion of a car adapted to be used for the purposes to which my invention relates; but it will be understood that cars of any of the now well-known constructions may be employed.

A represents the roof; A', the floor; $A^2$, a top beam; $A^3$, slats along the bottom of the sides; $A^4$, a brace plank or beam above the slats $A^3$; B, the vertical studs; B', the door, and C the doorway or passage in the side of the car through which the animals can pass their heads outward, and which the door B' is adapted to close. This door may be either arranged to slide, as shown in Figs. 5, 7, and 8, or to swing in any of the ordinary ways.

One of the ends at which I aim is to allow the animals to pass their heads out through the sides of the car whenever necessary, and at such times have before them a wall, guard, or fender which will prevent them from attempting to break through the side of the car.

Much difficulty has been experienced with stock-cars as heretofore constructed from the fact that the animals, after the doorways for their heads have been opened, have constantly attempted to escape through these openings. Their attempts to thus escape result either in their breaking more or less of the side of the car or in serious injury to the animals themselves. Especially is this true when dealing with cattle having the exceedingly long horns, characteristic of those of the wilder and fiercer breed of the west, for when the apertures or doorways are wide enough to allow them to pass their long horns out they (said apertures or doorways) are so large as to permit a large part of the body of the animals to be forced through also. This disposition on the part of the animals is entirely overcome by having at all times a fender or guard in front of their heads.

Referring to Fig. 1, E represents a platform, which, if necessary, may be elevated upon posts or supports E'. Upon this I have shown the guard and its supports, the latter consisting, in the construction shown in this figure, of uprights or posts F, together with sills $F'$ and braces $F^2$. This supporting-frame may be mounted upon wheels or rollers, so that it can be moved to and from the car, it resting either directly upon the top surface of the platform E or upon a track or in guides thereon; or said support may be made stationary, as shown in Figs. 4, 5, 6, and 8. Upon the support is arranged the guard G, which is so situated as to lie in front of the aforesaid aperture or doorway C in the side of the car. It is preferably made of one or more boards so arranged as to constitute a wall; but in this respect it may be more or less varied without departing from the spirit of the invention. It should be of sufficient width to close entirely the path which an animal would attempt to take in trying to escape from the car, and, if necessary, should be extended to points above said doorway C, as well as below the same; but here, too, there may be more or less variation, as occasion shall require.

By referring to Figs. 5 and 6 it will be seen that the watering or feeding of the cattle can be effected by devices carried by the car itself, and that a stationary guard by the side of the car can be used for the purpose above mentioned. H represents a trough carried by the car, and so situated that the animals can have access thereto after passing their heads through the doorway C. With a car thus constructed a movable guard may be used, as shown in Fig. 7. With one of the latter sort the distance from the side of the car can be regulated so as to accommodate animals of different kinds, and, moreover, the parts on the platform can be withdrawn so as to prevent them from being struck by passing cars;

or, instead of having the feeding or watering devices carried by the car itself, they may be secured to the supports F F, whether the latter be parts of a movable frame, as shown in Fig. 1, or be rigid in position. Referring to Fig. 4, the troughs H will be seen to be mounted upon the supports F in such manner that they can be swung up to the side of the car and then down out of the way. As shown in this figure, the arms H', which carry them, are pivotally connected to the supports F, and carry crank-arms or handles H², by means of which the arms H' can be rocked. To lock the trough in any desired position, any well-known means can be used, as, for instance, a ratchet and pawl, (indicated at H².) Substantially the same devices are shown in Fig. 8, except that the trough H and the arms H' are stationary so far as concerns a swinging of said arms. I prefer to have the troughs H so mounted upon their supports, whether the latter be on the car or by the side, and independent thereof, that they (said troughs) can be tilted about some line running longitudinally through them, so that they can be readily emptied. The guard G itself, whether carried by fixed supports, as in Figs. 4, 5, and 8, or by a movable frame, as in Figs. 1, 3, and 7, may be either rigid relatively to the parts F, or may be movable relatively thereto, for the purpose of effecting a vertical adjustment, or so that it can be thrown from one inclination to another. As shown in Fig. 1, it is pivotally mounted at $g$, and is provided with arms or handles G'. It can be turned up or down to any point required, and thereby may be used more effectively to close the path in an upward direction which might otherwise appear to be open to the animals attempting to escape, and can also be used as a cover for the trough H, to prevent the latter from being filled with refuse, offal, &c. It can be secured to any desired position by any of the mechanisms now well known for such purposes—such as slotted segment $g'$ and a clamp-screw, $g^2$, Fig. 1. In the construction shown in this figure and also in Fig. 2 one or more hay-racks, I, are attached to the supports F, there being boards or slats G² (see Fig. 2) employed for carrying the rack or racks. The parts last mentioned may be used as a guard either by themselves or to supplement that shown at G. When this part G is arranged as shown in Figs. 1 and 2, it can be swung up to inclose the hay-rack when the animals are drinking from the troughs H, and can be brought down over the troughs when the animals are eating from the racks.

In Fig. 3 a construction is shown in which the hay-racks I are also carried by the supports F, they being secured to the guard G, which latter is shown inclined, and which may be either movable or rigid relatively to the supports F. It will be understood that hay-racks may be thus combined with any one of the guards shown in the other constructions illustrated in the drawings. They may be either small racks, isolated from each other, or for each animal, or they may extend continuously from end to end of the car, or over any part of the length of it.

In Figs. 9, 10, 11, and 12 a guard, G, (substantially similar to that in the other figures,) is secured directly to the car itself; but I do not in this case claim any of the features incident to such guard when thus secured to the car, having shown and claimed the novel parts of this specific form in another application of mine, Serial No. 167,072, filed May 29, 1885. These figures, however, illustrate in this case some of the forms of the guard. For a full understanding of the details of these reference may be made to the other case aforesaid; but the following describes, generally, the main parts.

M is a counter-weight for the guard G, this, in Fig. 9, acting through a shaft, M', on the car, and through links $m$, the guard being secured to bars $m'$, hinged at $m^2$.

N is a supplemental weight, connected by a chain, $n$, over a pulley at $n'$. This may be omitted, as in Fig. 11, or the other weight may be omitted, as in Fig. 12. Trough H, Fig. 9, is tilted by toggle-levers. Water-pipe O feeds trough H, and is emptied by opening valve P, by means of rod $p$. Fig. 10 shows a side view of that in Fig. 9.

Another feature of my improved apparatus for loading, unloading, feeding, or watering stock in transit relates to the means which I have devised for passing the animals to and from the platform E relatively to the car. These devices form a gangway, (generally represented by K.)

Heretofore use has been made of a loose gang-plank—that is to say, one detached from both the car and the platform—and when it has been brought into use it was so arranged that one end rested loosely upon the platform, while the other rested loosely on the car-floor at the doorway. Many inconveniences and difficulties have been experienced in using these devices. The car-door cannot be closed while the plank is lying in the doorway; hence in loading it must be removed while the door is yet open, and during the time that the latter is being closed animals attempt to escape through the door, resulting in frequent injury. So, too, in unloading the same difficulty occurs, as the door must be opened before the gang-plank can be put into position, and unruly animals immediately attempt to break through; hence use is commonly made of what is called a "door-bar," which is only partially successful, and which is inconvenient and troublesome. I overcome these difficulties by supplying a gang-plank which can be adjusted in position relatively to the car-door whether the latter be open or shut. I employ an angle-iron or bar, L, fastened to the bottom sill of the car, and secure to the gang-plank K hooks $k$, adapted to engage with the said angle-iron or bar L, whereby the gang-plank is strongly connected with the car without the necessity of resting it upon the floor. As shown, the gang-plank is hinged to the platform E in Fig. 13, and in Fig. 14 it is secured thereto by hooks $k'$ and a bar or angle-iron, $L'$, similar to those at $k$ and L. For some reasons I prefer to hinge the gang-plank, as when so arranged it is always in place, and there is no liability of its being lost. It is so hinged that it can turn back and lie upon the top of the platform E when it is out of use, or it may be arranged to drop downward. Ordinary butt-hinges of sufficient strength can be employed, or a hinge-rod longer than the width of the gang-plank can be used, so that the latter can slide more or less to permit the gang-plank to be placed directly in front of the doorway, whether the car be stopped at a point exactly in front of the gang-plank or not.

Of course, it will be understood that in numerous respects the details which I have shown may be more or less varied without departing from the spirit of the invention, and more or less of said details may be withdrawn from the apparatus shown and combined with other constructions. Thus the part G shown in Fig. 1 may be employed to alternately cover a hay-rack and a watering-trough in other mechanisms for feeding and watering, and it may be arranged to slide instead of swing, or otherwise move from one to the other.

I am aware of the fact that use has been made of various devices upon stationary platforms for moving the watering and feeding troughs toward and from the car; but I do not know of use ever having been made of the simple but strong and effective means I have shown, consisting of a truck or rolling frame mounted directly upon the surface of the platform and having attached to it the devices for feeding or watering, or both.

What I claim is—

1. The combination, with the stock-car having an opening in the side wall for the outward passage of animals' heads, and devices, substantially as described, for feeding or watering, of a guard, G, adapted to be situated directly in front of said opening to prevent the escape of the animals, substantially as set forth.

2. The combination, with a stock-car having an opening in the side wall for the outward passage of the animals' heads, and means, substantially as described, for feeding or watering, of a guard, G, supported from the ground independently of the car and situated directly in front of said opening, substantially as and for the purposes set forth.

3. The combination, with a stock-car constructed, substantially as set forth, to permit the animals to be fed or watered outside of the car, of a guard, G, movable toward and from the car, and adapted to close the paths of escape for the animals' heads, substantially as set forth.

4. The combination, with a stock-car having an opening in the sides of the car for the animals' heads, of a guard situated directly in front of said aperture, a support or frame for said guard, and the wheels or rollers, substantially as set forth.

5. The combination, with the stock-car adapted to permit the outward passage of the animals' heads, of a guard, G, arranged substantially as set forth, whereby it can be inclined to the horizon, as described.

6. The combination, with a stock-car adapted to permit the outward passage of animals' heads, and a stationary platform by the side of the car, of a movable truck mounted upon said platform and provided with troughs or racks secured thereto, substantially as set forth.

7. In an apparatus for unloading and feeding or watering stock, the combination, with the car and the platform, of a gang-plank supported upon the platform substantially as set forth, and supported upon the car at points outside of the doorway, substantially as set forth.

8. In an apparatus for unloading and watering or feeding stock, the combination, with the car and the platform, of the gang-plank hinged to the platform and adapted to be supported upon the car at points outside of the door, substantially as set forth.

9. In an apparatus for unloading and feeding or watering stock, the combination, with the car and the platform, of a gang-plank hinged to the platform and provided with the hooks $k$ to permit its engaging with the car, substantially as described.

In testimony whereof I affix my signature in presence of two witnesses.

JOHN W. STREET.

Witnesses:
S. FROST,
M. L. ASH.